United States Patent
Wang et al.

(10) Patent No.: US 6,775,462 B1
(45) Date of Patent: Aug. 10, 2004

(54) TONE-CONTROLLED VIDEO MUTING

(75) Inventors: Yuti Wang, Irvine, CA (US); Rome Gutierrez, Paramount, CA (US); Douglas C. Brown, Aliso Viejo, CA (US)

(73) Assignees: Sony Corporation, Tokyo (JP); Sony Trans Com Inc., Irvine, CA (US)

( * ) Notice: Subject to any disclaimer, the term of this patent is extended or adjusted under 35 U.S.C. 154(b) by 0 days.

(21) Appl. No.: 09/570,080

(22) Filed: May 12, 2000

(51) Int. Cl.[7] .................................................. H04N 5/93
(52) U.S. Cl. .............................. 386/52; 386/46; 386/64
(58) Field of Search ................................ 386/1, 45–46, 386/39, 52, 96, 104, 125–126, 64; 360/25, 61, 75, 69, 72.2, 74.4

(56) References Cited

U.S. PATENT DOCUMENTS

| | | | | |
|---|---|---|---|---|
| 4,224,644 A | * | 9/1980 | Lewis et al. | 360/72.2 |
| RE32,342 E | * | 1/1987 | Wilder et al. | 360/72.2 |
| 4,727,443 A | * | 2/1988 | Miyake et al. | 360/75 |
| 5,337,193 A | * | 8/1994 | Murabayashi et al. | 386/104 |
| 5,734,786 A | * | 3/1998 | Mankovitz | 386/96 |

* cited by examiner

Primary Examiner—Thai Tran
Assistant Examiner—Christopher Onuaku
(74) Attorney, Agent, or Firm—Blakely, Sokoloff, Taylor & Zafman LLP

(57) ABSTRACT

The present invention is a method and apparatus to control muting a video output. A tone detector detects a first tone in a control tone signal generated by a video player during playing a video program from a master medium. The control tone signal is recorded on the master medium. The video player provides a video signal corresponding to the video program. A mute controller mutes a video output representing the video signal when the first tone is detected. The video output is recorded on a duplication medium in a video recorder.

30 Claims, 4 Drawing Sheets

TONE-CONTROLLED VIDEO MUTING

BACKGROUND

1. Field of the Invention

This invention relates to video processing. In particular, the invention relates to video muting.

2. Description of Related Art

Video recording typically involves many pieces of video equipment including video player and video recorder. Each equipment may have its own format and different data processing requirements. A video format may work with one machine for random video segment access but does not work with another machine from another different manufacturer during video playback.

For example, some video equipment uses pulse code modulation (PCM) index decoding to locate video segments on video track during playback. Some other equipment may just locate the video segments by identifying blank segments or gaps. A video tape recorded in one format therefore cannot be used with machine requiring a different format for random segment access.

Therefore, there is a need to have a technique to allow a video recorder to generate a video tape that can be used in both types of playback machines during random segment access by manipulating the timing of the gap and PCM index data.

SUMMARY

The present invention is a method and apparatus to control muting a video output. A tone detector detects a first tone in a control tone signal generated by a video player during playing a video program from a master medium. The control tone signal is recorded on the master medium. The video player provides a video signal corresponding to the video program. A mute controller mutes a video output representing the video signal when the first tone is detected. The video output is recorded on a duplication medium in a video recorder.

In one embodiment, the tone detector includes a bandpass filter, a rectifier, and a DC level detector. The bandpass filter passes the first tone. The rectifier rectifies the filtered first tone. The level detector detects a trigger level provided by the rectified audio tone, the trigger level indicating presence of the first tone. The mute controller includes a timer, a video input buffer, a video output amplifier, and a switch. The timer asserts a switch control signal having a mute interval when the trigger level is detected. The video output is muted during the mute interval. The video input buffer buffers the video signal. The video output amplifier receives the video signal and provides the video output. The switch attenuates the video signal according to the switch control signal. The attenuated video signal corresponds to the muted video output.

BRIEF DESCRIPTION OF THE DRAWINGS

The features and advantages of the present invention will become apparent from the following detailed description of the present invention in which.

DESCRIPTION

The present invention is a method and apparatus to control muting a video output. A tone detector detects a first tone in a control tone signal generated by a video player during playing a video program from a master medium. The control tone signal is recorded on the master medium. The video player provides a video signal corresponding to the video program. A mute controller mutes a video output representing the video signal when the first tone is detected. The video output is recorded on a duplication medium in a video recorder.

In one embodiment, the tone detector includes a bandpass filter, a rectifier, and a level detector. The bandpass filter passes the first tone. The rectifier rectifies the filtered first tone. The level detector detects a trigger level provided by the rectified audio tone, the trigger level indicating presence of the first tone. The mute controller includes a timer, a video input buffer, a video output amplifier, and a switch. The timer asserts a switch control signal having a mute interval when the trigger level is detected. The video output is muted during the mute interval. The video input buffer buffers the video signal. The video output amplifier receives the video signal and provides the video output. The switch attenuates the video signal according to the switch control signal. The attenuated video signal corresponds to the muted video output.

The present invention allows a media recorder to generate a media type that can be used by different types of media playback machines during random segment access. The different playback machines may include those using PCM index decoding to locate media segments on media track and those using blank segments or gaps.

In the following description, for purposes of explanation numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
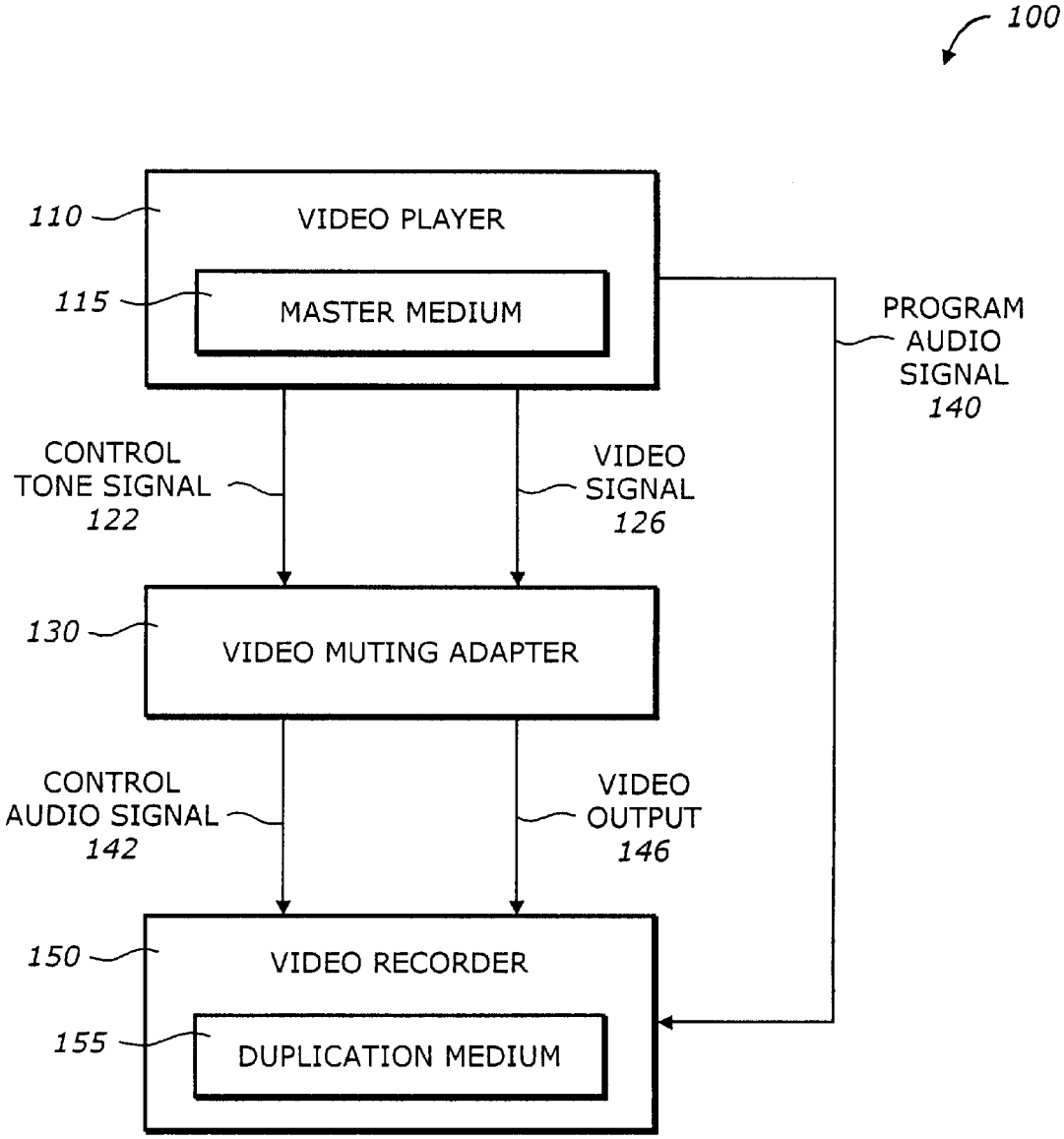
FIG. 1 is a diagram illustrating a system in which one embodiment of the invention can be practiced.

FIG. 1 is a diagram illustrating a system 100 in which one embodiment of the invention can be practiced. The system 100 includes a video player 110, a video muting controller 130, and a video recorder 150.

The video player 110 is a master video player that plays a video program embedded in a master medium 115. The master medium is any recording medium (e.g., digital, analog, compact disk, electromagnetic, magnetic, optical, laser) that contains the video program to be duplicated or recorded by the video recorder 150. In one embodiment, the master medium is a professional video tape, e.g., BetaCom. The video player 110 generates a control tone signal 122, a video signal 126, and a program audio signal 140. The control tone signal 122 contains an audio tone of a predetermined frequency to facilitate when muting is desired. The video signal 126 corresponds to the video program recorded on the master medium 115. Typically, the control tone signal 122 is synchronized with the video program so that the audio tone for muting corresponds to the video portion that does not need to be recorded, e.g., blank sections. The program audio signal 140 is the audio portion of the video program represented by the video signal 126. The program audio signal 140 goes directly from the video player 110 to the video recorder 150 without going through the video muting adapter 130.

The video muting adapter 130 is an adapter that is used between the video player 110 and the video recorder 150 to mute the video signal 126 when indicated by the control tone signal 122. The video muting adapter 130 provides a control audio signal 142 and a video output 146. The control audio signal 142 is essentially the same as the control tone signal 122. The control audio signal 142 may be generated by buffering the control tone signal 122. The video output 146 corresponds to the video signal 126. The video output 146 is the same as the video signal 126 when muting is not desired, i.e., when the normal duplication occurs. When muting is desired as indicated by the presence of the mute audio tone, the video output 146 has no video information, usually has a ground level.

The video recorder 150 records the video program as represented by the video output 146 on a duplication medium 155. The video recorder 150 receives the control audio signal 142 for PCM index function. The video recorder 150 also receives the program audio signal 140 directly.

Figure 2:
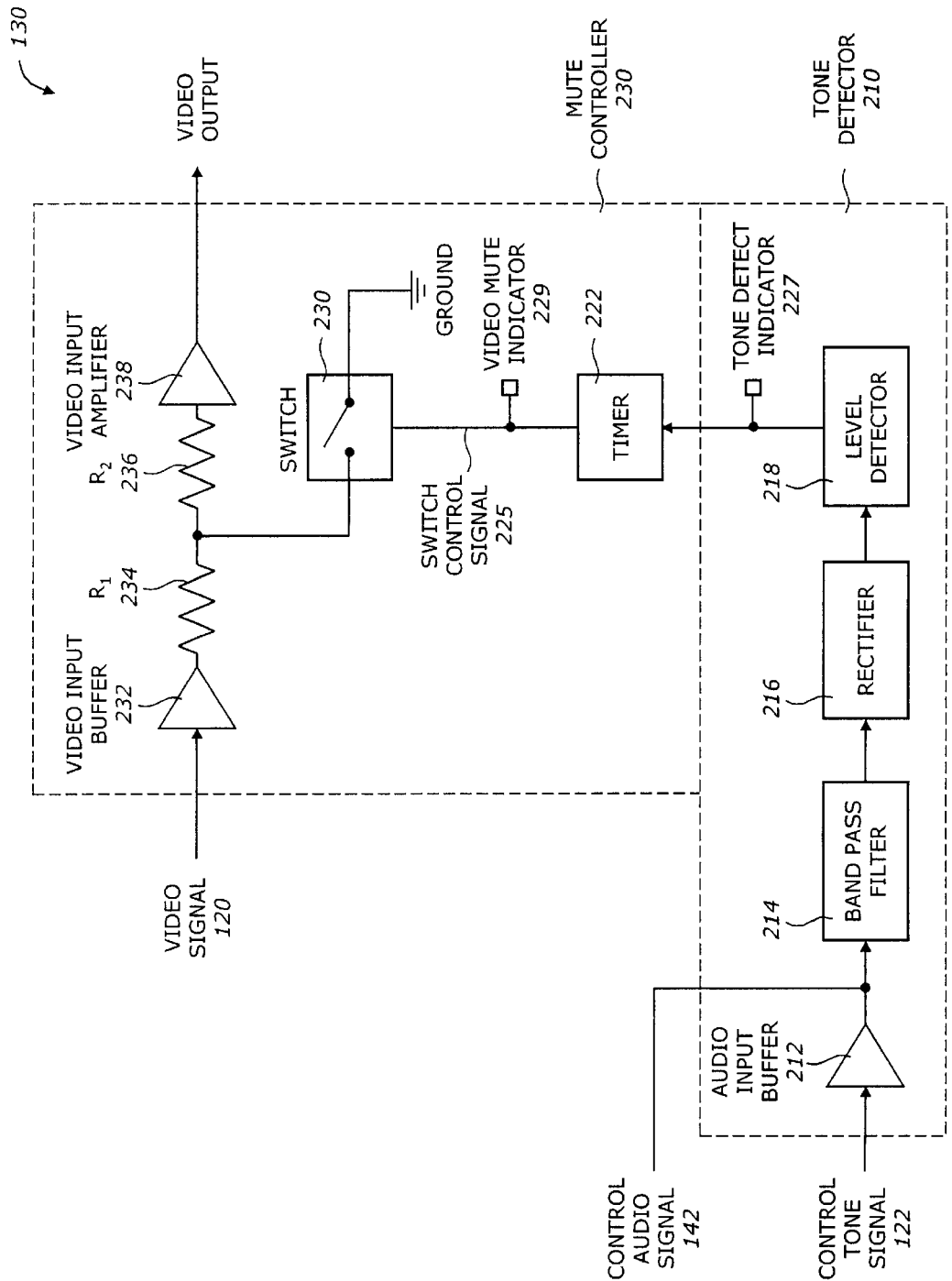
FIG. 2 is a diagram illustrating the video muting controller shown in FIG. 1 according to one embodiment of the invention.

FIG. 2 is a diagram illustrating the video muting adapter 130 shown in FIG. 1 according to one embodiment of the invention. The video muting adapter 130 includes a tone detector 210 and a mute controller 230.

The tone detector 210 detects the mute audio tone in the control tone signal 122 (FIG. 1). The tone detector 210 includes an audio input buffer 212, a bandpass filter 214, a precision rectifier circuit 216, and a DC level detector 218.

The audio input buffer 212 buffers and conditions the control tone signal 122. The bandpass filter 214 passes the mute audio tone and filters out all other tones (or frequencies). The bandpass filter 214 can be designed to operate at any bandpass frequency of the mute audio tone. In one embodiment, the mute audio tone is a 5 KHz signal. Therefore, the bandpass filter 214 has a bandpass bandwidth centered around the 5 KHz center frequency. The frequency of the mute audio tone is selected such that it is significantly different than frequencies of other signals that may be embedded in the control tone, e.g., the 400 Hz and 1 KHz audio signals.

The rectifier 216 rectifies the filtered audio tone to convert an alternating current (AC) signal, i.e., the mute audio tone, into a direct current (DC) signal. The level detector 218 detects a trigger level as carried by the mute audio tone. The level detector 218 may be implemented by an analog comparator that compares the rectified audio tone with a predetermined threshold that corresponds to the trigger level. The level detector 218 generates a signal indicative of the presence of the mute audio tone. This signal is of magnitude and level suitable to trigger the mute controller 230. For example, this signal may be a pulse of either high or low active level.

When the mute audio tone is not present in the control tone signal 122, the tone frequency is absent. Therefore, the bandpass filter 214 provides a signal having an AC characteristic of small or negligible magnitude. When the rectifier 216 rectifies this AC signal, it again produces a low magnitude signal. The level detector 218 then generates a DC signal having no pulse width, resulting in a non-triggering condition to the mute controller 230. The mute controller 230 is not triggered and therefore does not perform muting. The mute controller 230 merely passes the video signal 120 to the video output.

When the mute audio tone is present in the control tone signal 122, the tone frequency is present. The bandpass filter 214 passes this signal having the tone frequency, e.g., 5 KHz. This sinusoidal signal of the specified frequency is then rectified by the rectifier 216 to become a DC signal of some magnitude. This DC signal has a magnitude higher than the predetermined threshold in the level detector 218. The level detector 218 then produces a pulse to trigger the mute controller, indicating that muting is desired. Upon receipt of this triggering pulse, the mute controller performs the muting function and attenuate the video signal 120 so that the video output is driven to a non-video level, such as a ground level. The video information is therefore muted.

The mute controller 230 performs the muting function on the video signal 126 (FIG. 1) and produces the video output 146 (FIG. 1) according to the output of the tone detector 210. The mute controller 230 includes a timer 222, a switch 230, a video input buffer 232, resistors 234 and 236, and a video output buffer 238.

The timer 222 asserts a switch control signal 225 having a mute interval when the trigger level is detected. The mute interval is a time interval during which the video output is muted. The timer 222 receives the triggering pulse from the level detector 218 and generates a pulse having a pulse width corresponding to the muting time interval. The timer 222 can be implemented by a digital circuit clocked by some clock signal such that the mute interval can be accurately maintained. Examples of such a circuit include counters and timers.

The video input buffer 232 buffers the video signal 126. The video output amplifier 238 is coupled to the video input buffer 232 to receive the buffered video signal and provides the video output 146 (FIG. 1).

The switch control signal 225 as generated by the timer is used to control the switch 230. The switch 230 is an on/off, open/closed switch type. When the switch control signal is asserted, e.g., at a logic high level, the switch 230 is closed. When the switch control signal is de-asserted, e.g., at a logic low level, the switch 230 is open. In one embodiment, one side of the switch 230 is connected to a ground terminal having a ground level, and the other side of the switch 230 is connected to the signal path between the video input buffer 232 and the video output amplifier 238. The switch 230 attenuates the video signal according to the switch control signal 225. The attenuated video signal corresponds to the muted video output. Resistors 234 and 236 provides impedance loading signal path in response to the action of the switch 230. For example, when the switch 230 is open indicating no muting, the buffered video signal is allowed to pass through the video output amplifier unattenuated. When the switch 230 is closed indicating muting is desired, the input of the video output amplifier 238 is shunted to the ground level and the resulting video output is at a low level. In this case, the video output is muted because it does not provide any video information. The resistors 234 and 236 provide a current path so that the output of the video input buffer 232 is not shorted to ground that may cause damage to the device.

A tone indicator 227 may be connected at the output of the level detector 218 to indicate if the mute audio tone has been detected. Similarly, a video mute indicator 229 may be connected at the output of the timer 222 to indicate that muting is being performed.

Figure 3:
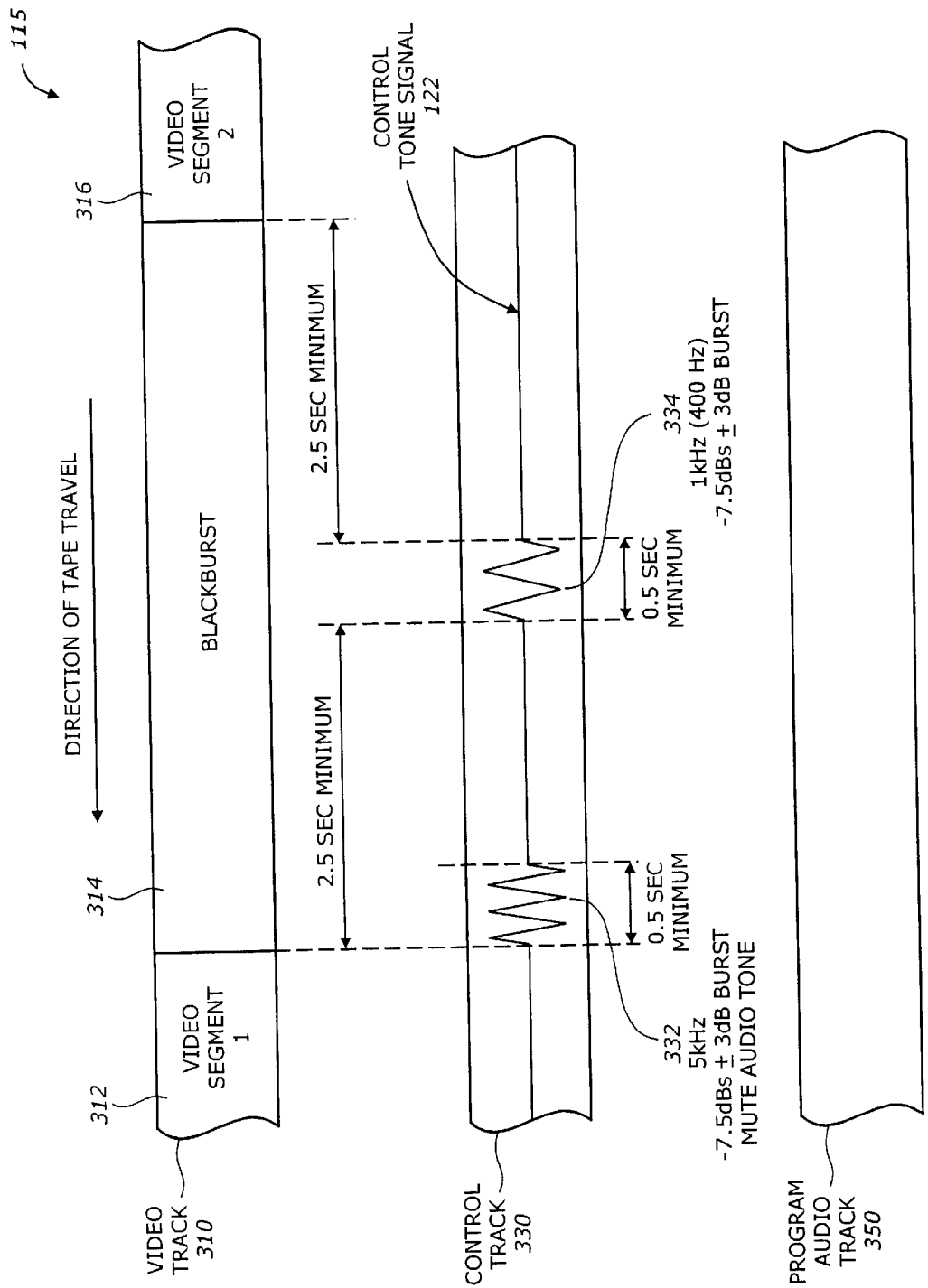
FIG. 3 is a diagram illustrating the format of the master medium according to one embodiment of the invention.

FIG. 3 is a diagram illustrating the format of the master medium 115 according to one embodiment of the invention. The master medium 115 includes a video track 310, a control track 330, and a program audio track 350.

The video track 310 contains the video program having several video segments such as video segments 312 and 316. The video segments 312 and 316 are separated by a black burst 314. The program audio track 350 contains the audio program corresponding to the video program in the video track 310.

The control track 330 is synchronized with the video track 310. The control track 330 contains information that corresponds to the control tone signal 122 (FIG. 1). In the exemplary illustration shown in the FIG. 3, the control tone signal 122 has a mute audio tone 332 and a second tone 334. The mute audio tone 332 and the second tone 334 are recorded on the control track 330 to fall within the video black burst segment 314. The recording locations of the mute audio tone 332 and the second tone 334 are known in advance and are used to determine the mute timing interval for the timer 222 (FIG. 2). In one embodiment, the mute audio tone 332 is a 5 KHz sinusoidal signal having a length of approximately 0.5 second minimum. The mute audio tone is recorded at the boundary between the video segment 312 and the front end of the black burst 314. The second tone is a signal having a frequency of 1 KHz or 400 Hz, having a length of 0.5 second minimum and is located approximately 2.5 seconds minimum from the boundary between the black burst 314 and the front end of the video segment 316. The mute audio tone 332 and the second tone have a signal strength of −7.5 dBs±3 dB burst.

Figure 4:
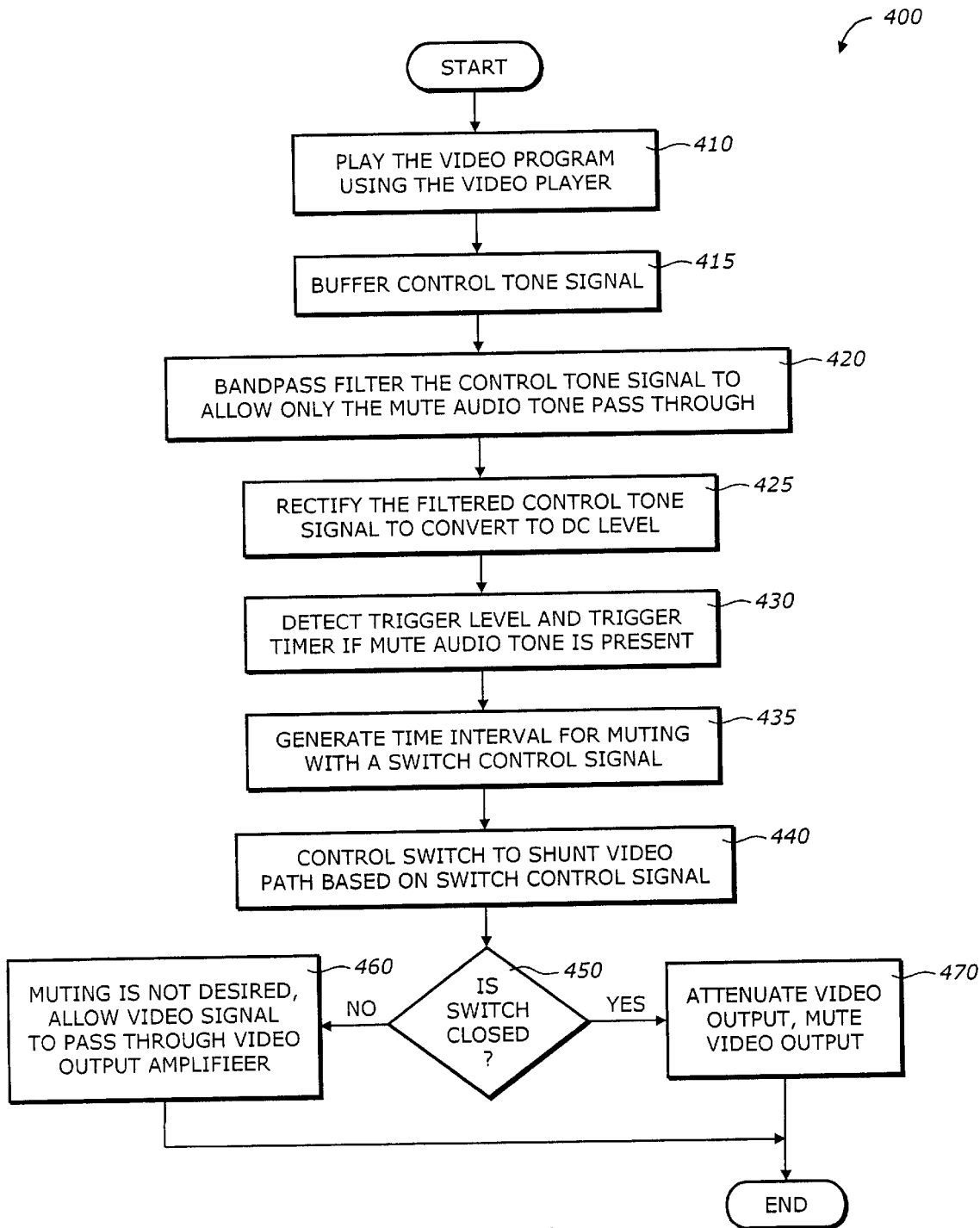
FIG. 4 is a flowchart illustrating a process to mute a video output according to one embodiment of the invention.

FIG. 4 is a flowchart illustrating a process 400 to mute a video output according to one embodiment of the invention.

Upon START, the process 400 plays the video program from the video player (Block 410). The video program is going to be duplicated on the duplication medium in the video recorder. Then the process 400 buffers the control tone signal as provided by the video player (Block 415). Then, the process 400 bandpass filters the control tone signal to extract the mute audio tone (FIG. 1) (Block 420). Next, the process 400 rectifies the filtered control tone signal to convert the signal into a DC level (Block 425). Then the process 400 detects the trigger level to trigger the timer (Block 430).

Next the process 400 generates a switch control signal to trigger the switch (Block 435). The switch corresponds to the black burst as shown in FIG. 2. Then, the process 400 controls the switch to shunt the video path based on the switch control signal (Block 440). Then, the process 400 determines if the switched is closed (Block 450). If the switch is closed, then video muting is desired, the signal path is shorted to ground, and the video output is attenuated (Block 470). The process 400 is then terminated. If the switch is not closed, it means that muting is not desired and the process 400 allows the video signal to pass through unattenuated (Block 460). The process 400 is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
 a tone detector to detect a first tone in a control tone signal generated by a video player during playing a video program from a master medium, the control tone signal being recorded on the master medium, the video player providing a video signal corresponding to the video program; and
 a mute controller coupled to the tone detector to mute a video output representing the video signal when the first tone is detected, the video output being recorded on a duplication medium in a video recorder.

2. The apparatus of claim 1 wherein the tone detector comprises:
 a bandpass filter to pass the first tone;
 a rectifier coupled to the bandpass filter to rectify the filtered first tone; and
 a level detector coupled to the rectifier to detect a trigger level provided by the rectified audio tone, the trigger level indicating presence of the first tone.

3. The apparatus of claim 2 wherein the mute controller comprises:
 a timer coupled to the level detector to assert a switch control signal having a mute interval when the trigger level is detected, the video output being muted during the mute interval;
 a video input buffer to buffer the video signal;
 a video output amplifier coupled to the video input buffer to receive the video signal, the video output buffer providing the video output; and
 a switch coupled to the timer and the video output buffer to attenuate the video signal according to the switch control signal, the attenuated video signal corresponding to the muted video output.

4. The apparatus of claim 3 wherein the switch is closed to shunt the video signal to ground when the switch control signal is asserted, the shunted video signal corresponding to the attenuated video signal.

5. The apparatus of claim 4 wherein the switch is open to pass the video signal through the video output amplifier unattenuated when the switch control signal is de-asserted.

6. The apparatus of claim 5 wherein the level detector comprises a comparator to compare the rectified first tone with a predetermined threshold corresponding to the trigger level.

7. The apparatus of claim 2 wherein the tone detector further comprises an audio input buffer to buffer the control tone signal.

8. The apparatus of claim 7 wherein the control tone signal comprises an second tone.

9. The apparatus of claim 7 wherein the first tone has a frequency approximately equal to or greater than 5 kHz.

10. The method of claim 9 wherein the second tone has a frequency less than 5 kHz.

11. The apparatus of claim 7 wherein the second tone has a frequency less than 5 kHz.

12. A method comprising:
 detecting a first tone in a control tone signal generated by a video player during playing a video program from a master medium, the control tone signal being recorded on the master medium, the video player providing a video signal corresponding to the video program; and
 muting a video output representing the video signal when the first tone is detected, the video output being recorded on a duplication medium in a video recorder.

13. The method of claim 12 wherein detecting the first tone comprises:
 bandpass filtering the first tone;
 rectifying the filtered first tone; and
 detecting a trigger level provided by the rectified audio tone, the trigger level indicating presence of the first tone.

14. The method of claim 13 wherein muting the video output comprises:

asserting a switch control signal having a mute interval when the trigger level is detected, the video output being muted during the mute interval;

buffering the video signal;

providing the video output from the buffered video signal; and attenuating the video signal according to the switch control signal, the attenuated video signal corresponding to the muted video output.

15. The method of claim 14 wherein attenuating the video signal comprises shunting the video signal to ground when the switch control signal is asserted, the shunted video signal corresponding to the attenuated video signal.

16. The method of claim 15 wherein attenuating the video signal further comprises passing the video signal through the video output buffer unattenuated when the switch control signal is de-asserted.

17. The method of claim 16 wherein detecting the trigger level comprises comparing the rectified first tone with a predetermined threshold corresponding to the trigger level.

18. The method of claim 13 wherein detecting the first tone further comprises buffering the control tone signal.

19. The method of claim 18 wherein the control tone signal comprises an second tone.

20. The method of claim 19 wherein the first tone has a frequency approximately equal to or greater than 5 kHz.

21. A system comprising:

a video player to play a video program from a master medium, the video player providing a video signal corresponding to the video program;

a video recorder to record a video output representing the video signal on a duplication medium; and an adapter coupled to the video player and recorder, the adapter comprising:

a tone detector to detect a first tone in a control tone signal generated by the video player during playing the video program from the master medium, the control tone signal being recorded on the master medium, and a mute controller coupled to the tone detector to mute a video output representing the video signal when the first tone is detected.

22. The system of claim 21 wherein the tone detector comprises:

a bandpass filter to pass the first tone;

a rectifier coupled to the bandpass filter to rectify the filtered first tone; and a level detector coupled to the rectifier to detect a trigger level provided by the rectified audio tone, the trigger level indicating presence of the first tone.

23. The system of claim 22 wherein the mute controller comprises:

a timer coupled to the level detector to assert a switch control signal having a mute interval when the trigger level is detected, the video output being muted during the mute interval;

a video input buffer to buffer the video signal;

a video output amplifier coupled to the video input buffer to receive the video signal, the video output buffer providing the video output; and a switch coupled to the timer and the video output buffer to control attenuation of the video signal according to the switch control signal, the attenuated video signal corresponding to the muted video output.

24. The system of claim 23 wherein the switch is closed to shunt the video signal to ground when the switch control signal is asserted, the shunted video signal corresponding to the attenuated video signal.

25. The system of claim 24 wherein the switch is open to allow the video signal passes through the video output amplifier unattenuated when the switch control signal is de-asserted.

26. The system of claim 25 wherein the level detector comprises a comparator to compare the rectified first tone with a predetermined threshold corresponding to the trigger level.

27. The system of claim 22 wherein the tone detector further comprises an audio input buffer to buffer the control tone signal.

28. The system of claim 27 wherein the control tone signal comprises an second tone.

29. The system of claim 28 wherein the first tone has a frequency approximately equal to or greater than 5 kHz.

30. The system of claim 29 wherein the second tone has a frequency less than 5 kHz.

* * * * *